(12) United States Patent
Plocher et al.

(10) Patent No.: US 8,538,687 B2
(45) Date of Patent: Sep. 17, 2013

(54) SYSTEM FOR GUIDANCE AND NAVIGATION IN A BUILDING

(75) Inventors: Tom Plocher, Hugo, MN (US); Henry Chen, Beijing (CN); Jian Geng Du, Beijing (CN)

(73) Assignee: Honeywell International Inc., Morristown, NJ (US)

( * ) Notice: Subject to any disclaimer, the term of this patent is extended or adjusted under 35 U.S.C. 154(b) by 422 days.

(21) Appl. No.: 12/773,688

(22) Filed: May 4, 2010

(65) Prior Publication Data
US 2011/0276264 A1    Nov. 10, 2011

(51) Int. Cl.
*G01C 21/00* (2006.01)
(52) U.S. Cl.
USPC .......................................... 701/434; 701/433
(58) Field of Classification Search
USPC .................................................. 701/433, 434
See application file for complete search history.

(56) References Cited

U.S. PATENT DOCUMENTS

| | | | |
|---|---|---|---|
| 5,719,561 A | 2/1998 | Gonzales | |
| 5,745,126 A | 4/1998 | Jain et al. | |
| 5,857,986 A | 1/1999 | Moriyasu | |
| 6,006,161 A * | 12/1999 | Katou | 701/410 |
| 6,334,211 B1 | 12/2001 | Kojima et al. | |
| 6,710,706 B1 | 3/2004 | Withington et al. | |
| 6,720,921 B2 | 4/2004 | Ripingill, Jr. et al. | |
| 6,876,951 B2 | 4/2005 | Skidmore et al. | |
| 6,900,762 B2 | 5/2005 | Andrews et al. | |
| 6,924,787 B2 | 8/2005 | Kramer et al. | |
| 6,965,312 B2 | 11/2005 | Lerg | |
| 7,002,551 B2 | 2/2006 | Azuma et al. | |
| 7,062,722 B1 | 6/2006 | Carlin et al. | |
| 7,102,510 B2 | 9/2006 | Boling et al. | |
| 7,111,783 B2 | 9/2006 | Xi et al. | |
| 7,132,928 B2 | 11/2006 | Perricone | |
| 7,139,685 B2 | 11/2006 | Bascle et al. | |
| 7,146,218 B2 | 12/2006 | Esteller et al. | |
| 7,164,972 B2 | 1/2007 | Imhof et al. | |
| 7,200,639 B1 | 4/2007 | Yoshida | |

(Continued)

FOREIGN PATENT DOCUMENTS

| GB | 2441434 | 5/2008 |
|---|---|---|
| JP | 11024735 | 1/1999 |

(Continued)

OTHER PUBLICATIONS

Davies et al., "Scalable, Distributed, Real-Time Map Generation," IEEE, Intelligent Transport Systems, pp. 47-54, 2006.

(Continued)

*Primary Examiner* — Helal A Algahaim
(74) *Attorney, Agent, or Firm* — Seager Tufte & Wickhem LLC.

(57) ABSTRACT

A system for guidance and navigation in a building. For example, the system may determine a route for egress or rescue of one or more people from a building with a hazardous condition. The system may process the route into waypoints and segments developed within a set of constraint rules. Semantic information about the building may be associated with the waypoints and/or segments. The waypoints and segments may be processed into navigation commands. The navigation commands may be formed in natural language from sentence templates. The system may additionally have 3D beacon audio to assist in guidance and navigation of the one or more people in the building.

17 Claims, 9 Drawing Sheets

(56) References Cited

U.S. PATENT DOCUMENTS

| | | | |
|---|---|---|---|
| 7,246,008 B2 | 7/2007 | Daubert et al. |
| 7,246,044 B2 | 7/2007 | Imamura et al. |
| 7,292,908 B2 | 11/2007 | Borne et al. |
| 7,301,648 B2 | 11/2007 | Foxlin |
| 7,304,442 B2 | 12/2007 | Colwell |
| 7,308,323 B2 | 12/2007 | Kruk et al. |
| 7,342,648 B2 | 3/2008 | Solomon et al. |
| 7,358,458 B2 | 4/2008 | Daniel |
| 7,359,840 B2 | 4/2008 | Akasaka et al. |
| 7,382,281 B2 | 6/2008 | Kavaler |
| 7,383,148 B2 | 6/2008 | Ahmed |
| 7,389,207 B2 | 6/2008 | Saitta |
| 7,420,510 B2 | 9/2008 | Kolavennu et al. |
| 7,512,450 B2 | 3/2009 | Ahmed |
| 7,523,022 B2 | 4/2009 | Thomas et al. |
| 7,545,263 B2 | 6/2009 | Plocher et al. |
| 7,548,833 B2 | 6/2009 | Ahmed |
| 7,567,844 B2 | 7/2009 | Thomas et al. |
| 7,583,275 B2 | 9/2009 | Neumann et al. |
| 7,596,473 B2 | 9/2009 | Hansen et al. |
| 7,606,579 B2 | 10/2009 | Thacher |
| 7,610,910 B2 | 11/2009 | Ahmed |
| 7,612,832 B2 | 11/2009 | Zhang et al. |
| 7,664,574 B2 | 2/2010 | Imhof et al. |
| 7,683,793 B2 | 3/2010 | Li et al. |
| 7,715,980 B2 | 5/2010 | Bargeron et al. |
| 7,733,836 B2 | 6/2010 | Huseth |
| 7,764,220 B1 | 7/2010 | Samaniego |
| 7,774,075 B2 | 8/2010 | Lin |
| 7,777,666 B2 | 8/2010 | Gregory et al. |
| 7,830,250 B2 | 11/2010 | Huseth et al. |
| 7,898,468 B2 | 3/2011 | Samaniego et al. |
| 7,962,150 B2 | 6/2011 | Hertzog et al. |
| 7,973,669 B2 | 7/2011 | Pham et al. |
| 7,982,614 B2 | 7/2011 | Holm et al. |
| 8,040,273 B2 | 10/2011 | Tomich et al. |
| 8,041,744 B2 | 10/2011 | Heikkonen et al. |
| 8,089,407 B2 | 1/2012 | Chen et al. |
| 8,102,423 B2 | 1/2012 | Cheng |
| 8,279,119 B2 | 10/2012 | Elwell, Jr. et al. |
| 8,289,390 B2 | 10/2012 | Aggarwal et al. |
| 8,352,218 B2 | 1/2013 | Balla et al. |
| 2002/0055384 A1 | 5/2002 | Armstrong |
| 2003/0083957 A1 | 5/2003 | Olefson |
| 2003/0214400 A1 | 11/2003 | Mizutani et al. |
| 2004/0021569 A1 | 2/2004 | Lepkofker et al. |
| 2004/0030491 A1* | 2/2004 | Hull .............................. 701/207 |
| 2004/0233192 A1 | 11/2004 | Hopper |
| 2005/0010460 A1 | 1/2005 | Mizoguchi et al. |
| 2005/0264558 A1 | 12/2005 | Vesely et al. |
| 2005/0267900 A1 | 12/2005 | Ahmed et al. |
| 2006/0009862 A1 | 1/2006 | Imhof et al. |
| 2006/0029256 A1 | 2/2006 | Miyoshi et al. |
| 2006/0044307 A1 | 3/2006 | Song |
| 2006/0061752 A1 | 3/2006 | Solomon et al. |
| 2006/0073455 A1 | 4/2006 | Buyl et al. |
| 2006/0247849 A1* | 11/2006 | Mohsini et al. ............... 701/206 |
| 2006/0265664 A1 | 11/2006 | Simons et al. |
| 2007/0001904 A1* | 1/2007 | Mendelson ................... 342/450 |
| 2007/0201421 A1 | 8/2007 | Huseth |
| 2007/0205886 A1 | 9/2007 | Huseth et al. |
| 2007/0239350 A1 | 10/2007 | Zumsteg et al. |
| 2007/0239352 A1 | 10/2007 | Thota et al. |
| 2007/0279210 A1 | 12/2007 | Li et al. |
| 2008/0033645 A1 | 2/2008 | Levinson et al. |
| 2008/0040669 A1 | 2/2008 | Plocher et al. |
| 2008/0062167 A1 | 3/2008 | Boggs et al. |
| 2008/0068267 A1 | 3/2008 | Huseth et al. |
| 2008/0077326 A1* | 3/2008 | Funk et al. .................... 701/220 |
| 2008/0122696 A1 | 5/2008 | Huseth et al. |
| 2008/0158256 A1 | 7/2008 | Russell et al. |
| 2008/0215524 A1 | 9/2008 | Fuchs et al. |
| 2008/0220780 A1 | 9/2008 | Huseth et al. |
| 2008/0228039 A1 | 9/2008 | Huseth et al. |
| 2008/0312819 A1* | 12/2008 | Banerjee ....................... 701/202 |
| 2009/0040175 A1 | 2/2009 | Xu et al. |
| 2009/0043504 A1* | 2/2009 | Bandyopadhyay et al. .. 701/213 |
| 2009/0044808 A1 | 2/2009 | Guney et al. |
| 2009/0046140 A1 | 2/2009 | Lashmet et al. |
| 2009/0105006 A1 | 4/2009 | Doyle |
| 2009/0216438 A1 | 8/2009 | Shafer |
| 2009/0216775 A1 | 8/2009 | Ratliff et al. |
| 2009/0265104 A1* | 10/2009 | Shroff ........................... 701/216 |
| 2009/0298024 A1 | 12/2009 | Batzler et al. |
| 2009/0307255 A1 | 12/2009 | Park |
| 2010/0057354 A1 | 3/2010 | Chen et al. |
| 2010/0121567 A1* | 5/2010 | Mendelson ................... 701/206 |
| 2010/0299065 A1* | 11/2010 | Mays ............................ 701/209 |
| 2011/0059698 A1 | 3/2011 | Huseth et al. |
| 2011/0082643 A1 | 4/2011 | Huseth et al. |
| 2011/0112875 A1 | 5/2011 | Johnson et al. |
| 2011/0137549 A1* | 6/2011 | Gupta et al. ................... 701/201 |
| 2011/0153279 A1 | 6/2011 | Zhang et al. |
| 2011/0164768 A1 | 7/2011 | Huseth et al. |
| 2011/0248847 A1 | 10/2011 | Huseth et al. |
| 2011/0268300 A1 | 11/2011 | Plocher et al. |
| 2011/0270584 A1* | 11/2011 | Plocher et al. .................... 703/1 |
| 2011/0270654 A1* | 11/2011 | Banerjee et al. ............. 705/14.4 |
| 2011/0285851 A1 | 11/2011 | Plocher et al. |
| 2012/0130632 A1* | 5/2012 | Bandyopadhyay et al. .. 701/446 |
| 2012/0143495 A1* | 6/2012 | Dantu ........................... 701/428 |
| 2012/0169530 A1 | 7/2012 | Padmanabhan et al. |
| 2012/0173204 A1 | 7/2012 | Padmanabhan et al. |
| 2012/0194517 A1 | 8/2012 | Izadi et al. |
| 2012/0319903 A1 | 12/2012 | Huseth et al. |

FOREIGN PATENT DOCUMENTS

| | | |
|---|---|---|
| JP | 11317936 | 11/1999 |
| JP | 2001356813 | 12/2001 |
| JP | 2005242531 | 9/2005 |
| JP | 2005311563 | 11/2005 |
| JP | 2007183432 A | 7/2007 |
| JP | 2007333998 A | 12/2007 |
| WO | WO 92/10953 | 7/1992 |
| WO | WO 2005/033912 | 4/2005 |
| WO | WO 2005/040989 | 5/2005 |
| WO | WO 2009/029834 | 3/2009 |
| WO | WO 2009/071919 | 6/2009 |
| WO | 2010107379 A1 | 9/2010 |

OTHER PUBLICATIONS http://www.sara.com/ISR/low_frequency_EM/magnetic_communication.html, "Magnetic Communications," 2 pages, Jun. 27, 2011.

Matsumoto, "Real-Time Multi-Sensor Localisation and Mapping Algorithms for Mobile Robots," 309 pages, 2009.

Yagi et al., "Real-Time Generation of Environmental Map and Obstacle Avoidance Using Omnidirectional Image Sensor with Conic Mirror," IEEE, pp. 160-165, 1991.

U.S. Appl. No. 12/573,398, filed Oct. 5, 2009.

U.S. Appl. No. 12/772,310, filed May 3, 2010.

U.S. Appl. No. 12/771,252, filed Apr. 30, 2010.

U.S. Appl. No. 12/783,770, filed May 20, 2010.

Engineering Acoustics, Inc., "Tactor Interface/Controller Advanced Evaluation Board Eval.2.0," 2 pages, prior to Apr. 30, 2010.

Walker et al., "Development and Evaluation of a System for Wearable Audio Navigation," Proceedings of the Human Factors and Ergonomics Society 49th Annual Meeting, pp. 1607-1609, 2005.

"Incident Management IPT Requirements BAA for Topics Related to Geospatial Location Accountability and Navigation System for Emergency Responders (GLANSER)," Broad Agency Annoucement BAA09-02, pp. 1-34, Jan. 23, 2009.

Baronski, "New Sensor Signal Processor Paradigms: When One Pass Isn't Enough," HPEC, 19 pages, 2008.

Budroni et al., "Automated 3D Reconstruction of Interiors from Point Clouds," International Journal of Architechtural Computing, vol. 8, Issue 1, pp. 55-74, Mar. 2010.

Cinaz et al., "HeadSLAM—Simultaneous Localization and Mapping with Head-Mounted Inertial and Laser Range Sensors," IEEE pp. 3-10, 2008.

U.S. Appl. No. 13/538,677, filed Jun. 29, 2012.

Davison, "Real-Time Simultaneous Localisation and Mapping with a Single Camera," Proceedings of the Ninth IEEE International Conference on Computer Vision, pp. 1-8, 2003.

Fischer et al., "Location and Navigation Support for Emergency Responders: A Survey," IEEE CS, pp. 38-47, 2010.

Henke, "The Table Metaphor: A Representation of a Class and Its Instances," pp. 93-98, prior to Dec. 23, 2009.

Honeywell, "Excel Building Supervisor-Integrated R7044 and FS90 Ver. 2.0," Operator Manual, 70 pages, Apr. 1995.

Honeywell, "Precision Indoor Personnel Location and Tracking for Emergency Responders," 20 pages, Aug. 3-4, 2009.

http://kpogre.sourceforge.net/tutorial03/index.html, "Create Tabe Using Wizard," 8 pages, printed Oct. 18, 2009.

http://uic.edu/depts/accc/seminars/access2000-intro/tables.html, "Creating Tables with the Table Wizard-Access 2000 Introduction," 3 pages, Oct. 18, 2009.

http://www.firerescue1.com/print.asp?act=print&vid=405845, "3-D Locator Featured at Washington Tech. Demonstration," 3 pages, Jun. 20, 2008.

Johnston et al., "Estimating Building Floor-Plans From Exterior Using Laser Scanners," SPIE IS&T vol. 6805, 11 pages, 2008.

Kumar et al., "Robot and Sensor Networks for First Responders," IEEE CS and IEEE ComSoc, pp. 24-33, Oct.-Dec. 2004.

Le et al., "Ultrawideband (UWB) Radar Imaging of Building Interior: Measurements and Predictions," IEEE Transactions on Geoscience and Remote Sensing, vol. 47, No. 5, pp. 1409-1420, May 2009.

Rashidi, "Smart Home Adaptation Based on Explicit and Implicit User Feedback," 166 pages, Dec. 2007.

Rau et al., "Geometrical Building Modeling and Its Application to the Ortho-Rectification for Aerial Images," Journal of Photogrammetry and Remote Sensing, vol. 9, No. 1, pp. 53-76, Mar. 2004.

Sacks et al., "A Project Model for an Automated Building System: Design and Planning Phases," Automation in Construction, vol. 7, pp. 21-34, 1997.

Snavely et al., "Modeling the World from Internet Photo Collections," International Journal of Computer Vision, vol. 80, Issue 2, pp. 189-210, 2008.

Trane, "System Programming, Tracer Summit Version 14, BMTW-SVP01D-EN," 623 pages, 2002. (This reference will be uploaded in 3 parts).

Wang et al., "Camera Localization and Building Reconstruction from Single Monocular Images," 8 pages, 2008.

www.automatedbuildings.com/news/may10/articles/lavelleenergy/100427104606lavelle.htm, "Virtual Building Energy Management Moving to Cloud-based Building Energy Management," 7 pages, May 2010.

* cited by examiner

SYSTEM FOR GUIDANCE AND NAVIGATION IN A BUILDING

BACKGROUND

The invention pertains to providing protective and rescue measures for one or more people in a building with, for instance, fire and/or smoke. The invention particularly pertains to systems that provide these measures and more particularly enable people to provide these measures for others and themselves.

SUMMARY

The invention is a system for guidance and navigation in a building. For example, the system may determine a route for egress or rescue of one or more people from a building having a hazardous condition. The system may process the route into waypoints and segments developed within a set of constraint rules. Semantic information about the building may be associated with the waypoints and/or segments. The waypoints and segments may be processed into navigation commands. The navigation commands may be formed in natural language from sentence templates. The system may additionally have 3D beacon audio to assist in guidance and navigation of the one or more people in the building.

DESCRIPTION

The firefighters may often become disoriented on a search and rescue operation in a building, especially with a heavy smoke in it. Disorientation is clearly a situation that they may fear. Traditionally, firefighters are trained to manage search and rescue systematically. For example, they may always go to their left or always to their right. So in this way they can usually remember left and right relative to where they entered the building. And sometimes the firefighters may go in a circle and end up back at the entrance where they started. If there is smoke obscuration, they may feel for windows or doors and count them as they go. Then they may go backwards along the same route, counting the same windows or doors. Sometimes, the firefighters may use a rope connected to the entrance. Sometimes, they may place a sticker on a door after the room has been searched. So, later, if the firefighters can still see the stickers, then they may know that the stickers are part of their past path. If they have a hose laid on the floor to the fire room, they may be taught to follow the hose to get out of the building.

With all of these things considered, fire situations may be still bad. The firefighters may get disoriented and need to try to find their own way out, which is difficult, especially in heavy smoke. However, with the present sensing technology, one may now get the location and the orientation of a firefighter or other person in a building. At the same time, one may access a building information model. With this information, one may retrieve the optimal route at runtime with various technologies, such as "route search in the weighted graph" or "time dependent route planning", but it may still be difficult to describe the routes (with some line segments) to the firefighter. For example, it may be difficult to go to the right place by following ordinary voice directions. However, with a display system, the fire commander may see the location and orientation information of a firefighter of concern. But it appears error-prone for the commander to attempt to orally guide a firefighter in a stressful and high workload situation. It appears even less feasible for the commander to guide several firefighters at the same time.

Relevant patent documents may include U.S. Pat. No. 7,683,793, issued Mar. 23, 2010, and entitled "Time-Dependent Classification and Signaling of Evacuation Route Safety"; U.S. patent application Ser. No. 12/200,158, filed Aug. 28, 2008, and entitled "Method of Route Retrieval"; and U.S. patent application Ser. No. 12/573,398, filed Oct. 05, 2009, and entitled "Location Enhancement System and Method Based on Topology Constraints". U.S. Pat. No. 7,683,793, issued Mar. 23, 2010, is hereby incorporated by reference. U.S. patent application Ser. No. 12/200,158, filed Aug. 28, 2008, is hereby incorporated by reference. U.S. patent application Ser. No. 12/573,398, filed Oct. 05, 2009, is hereby incorporated by reference.

The present approach may automatically generate meaningful speech navigation commands and play these commands on demand and combine them with a 3D audio beacon as a route guidance assistant, to guide a person in a building.

In one version, a firefighter's location and orientation may be shown on a display system, provide an interface for the fire commander to set a route or to set a destination for a firefighter (or a group of firefighters) via various ways. With the optimal route at runtime obtained from the system, the present approach may generate meaningful speech navigation commands. Examples of these commands may be: "go cross the hallway, walk about 18 meters until you reach a column", "turn left to face the door and then enter", "go around the column and go forward 10 meters", and so forth. A form or template for the commands may be "'action word' 'where' 'amount'" (e.g., go forward some meters). There may be variations of this template. The number of templates may be limited. The system may then play the template commands on demand and also combine them with 3D audio beacons to assist the firefighter in navigating about inside a building, particularly where visibility is limited.

Highlights of the present approach lie primarily in automatic generation of the speech navigation commands. For instance, a real-time route may be split into segments and waypoints within constraint rules. Building semantic information such as landmarks may be attached to the segments and waypoints. Natural language navigation commands may be generated with sentence templates. Another highlight may be a combination of the natural language navigation commands with a 3D audio beacon oriented on the waypoints to serve as a multimodal navigation assistant.

Manual route planning by the fire incident commander may be replaced with an automatic route planner that is aware of spreading fire and smoke conditions in the building and can adaptively plan a safe egress route (See U.S. Pat. No. 7,683,793, issued Mar. 23, 2010). Under conditions of poor visibility, it may be noted that people actually remember the route they took into a building better than people navigating under good visibility. Therefore, under conditions of poor visibility (e.g., smoke or darkness), and barring obvious hazards, the best route out of the building that the route planner may plan is the reverse of the route that the person followed into the building. From the location system, one may know what path a disoriented person followed to his or her current location. Also, the visibility conditions are known. Thus, if it is determined that the conditions of poor visibility exist, the route planner may use the location data which describes the route of ingress to compute virtually an exact reverse route for a route of egress. The present approach may take the automatically planned route and produce meaningful guidance commands from such planned route. One may define certain rules so as to automatically determine the best particular context-speech or 3D audio.

An automobile navigation system may generate speech commands because the road is preinstalled. But the navigation in a building with a fire is much different due to the egress or rescue route being formed and subject to sudden revisions in real-time. For example, the route out of the building is not necessarily the same as the route this person followed into the building (as indicated by the person's track) because that route may have become unsafe during the incident and it may be a very inefficient path out of the building. Landmarks play an important role in navigation, but it may not be feasible to manually attach the landmarks to a route, just like many related-art navigation systems, during a rescue in an incident.

One may have a tracking system to get a firefighter's location and orientation, and a location system for a first responder commander to see the information. However, the incident commander may be busy, plus it would be a poor use of the commander's time to guide firefighters verbally over a radio from a remote display.

The present approach may automatically generate meaningful speech commands and play these commands on demand and combine them with the commands of a 3D beacon audio as an assistant navigation mode.

The approach may show a firefighter's location and orientation on a commander's display system (e.g., a FirstVision™ location display may be available from Honeywell International Inc.). The approach may also have an interface to set routes or select points of exit for the firefighter. There may be a module for computing the optimal route at runtime and another module for generating navigation commands. Items may incorporate splitting a route into segments and waypoints, attaching building semantic information to a waypoint or segment, generating a meaningful speech navigation command, simulating a 3D beacon audio on the next waypoint, and generating feedback audio to remind the firefighter of the way.

Figure 1:
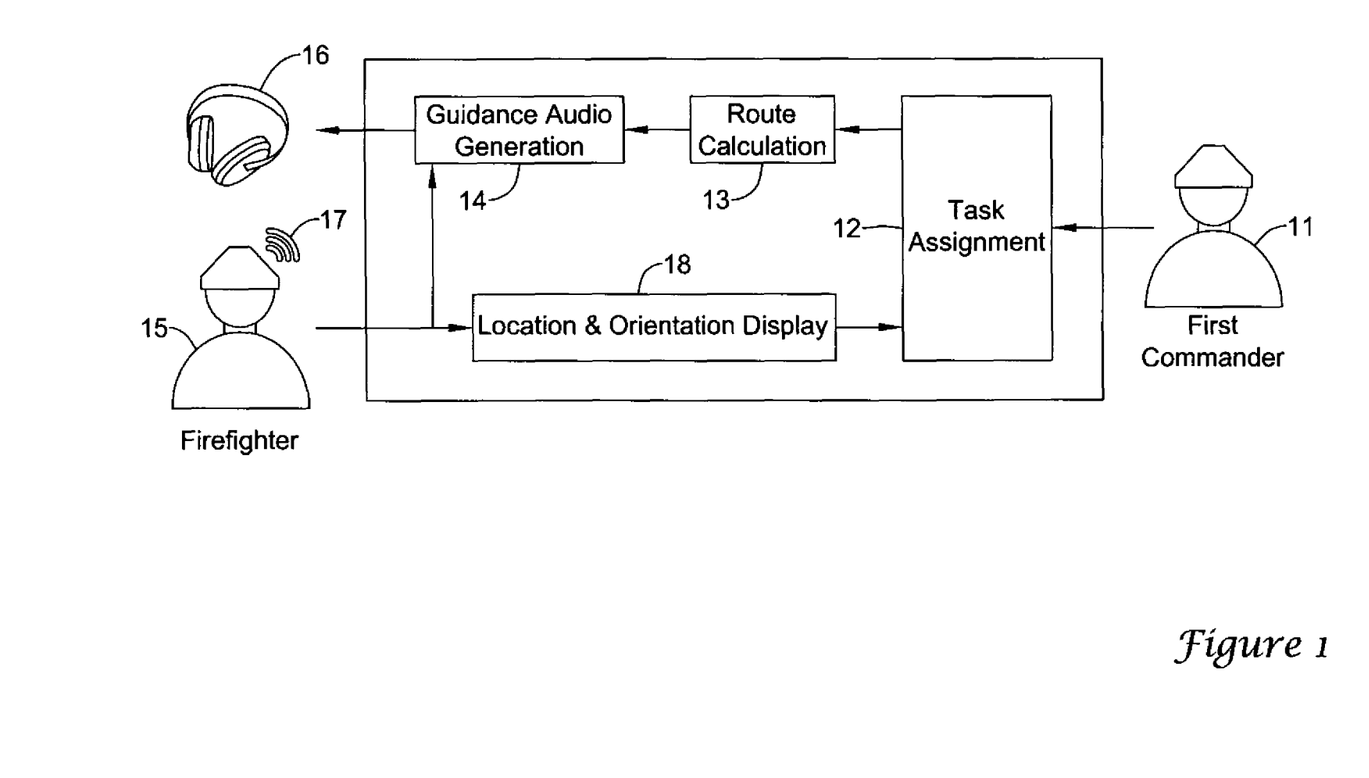
FIG. 1 is a diagram of a relationship between a first commander and a firefighter.

FIG. 1 is a diagram of a relationship between a first responder commander and a firefighter. The first responder commander 11 may provide a task assignment 12. Then a route may be calculated at symbol 13. The route may lead a generation of audio guidance at symbol 14. The guidance may be provided to a firefighter 15 via, for example, a set of wireless earphones 16. A location and orientation sensor 17 may be situated on the firefighter 15. Sensor 17 may provide information to a location and orientation display 18. Information from display 18 may be provided to the first responder commander 11 who might refine the task assignment at symbol 12.

Figure 2:
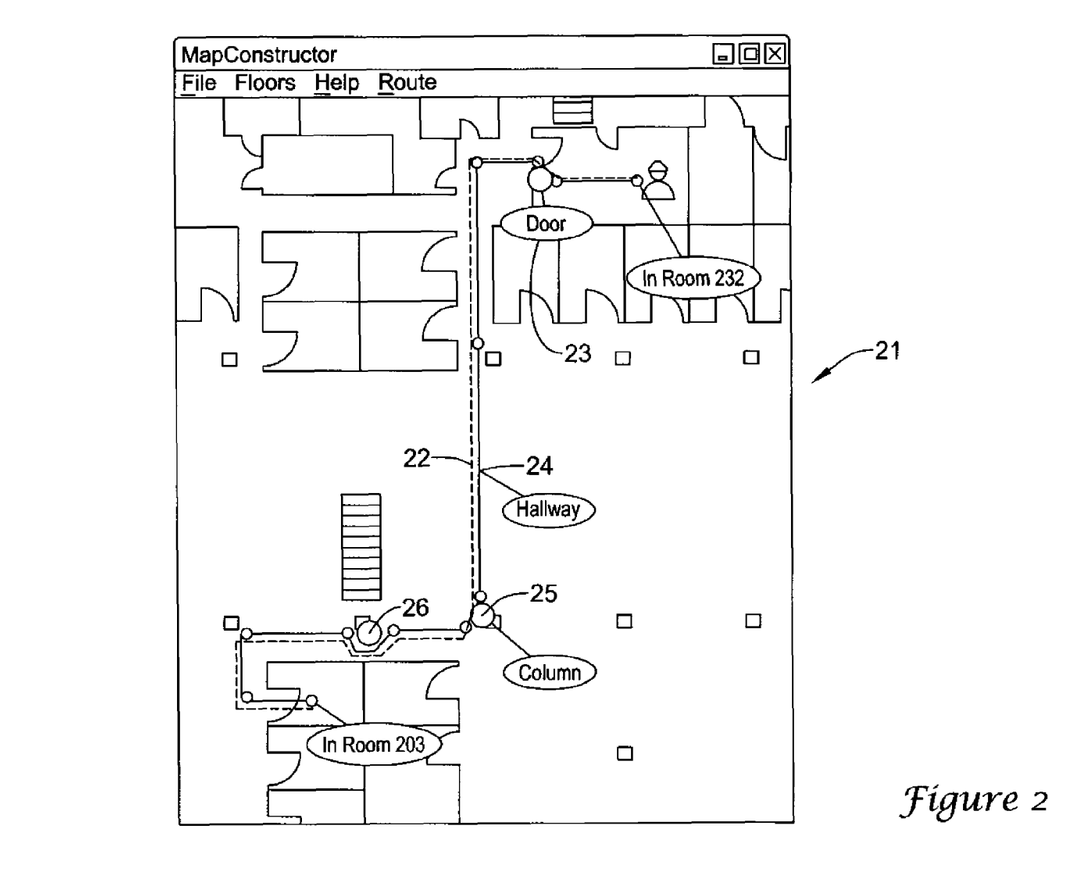
FIG. 2 is a diagram showing a suggested egress or rescue route for a floor in a building that may be filled with smoke and/or fire.

FIG. 2 is a diagram showing a suggested route 22 for a floor 21 in a building that may be filled with smoke. Particulars of route 22 on floor 21 from room 232 to room 203 are shown. A navigation command may be provided for route 22. The command may indicate the following: turn left 90 degrees and go forward until you reach a door (23); go out of the door and go forward 5 meters; turn left 90 degrees and go forward 15 meters; go cross the hallway (24), walk about 18 meters until you reach a column (25); turn right 90 degrees and go forward to a column (26); get around the column and go forward 10 meters; turn left 90 degrees and go forward 5 meters; and turn left to face and enter a door. The numbers in parentheses are not necessarily part of the navigation command.

Figure 3:
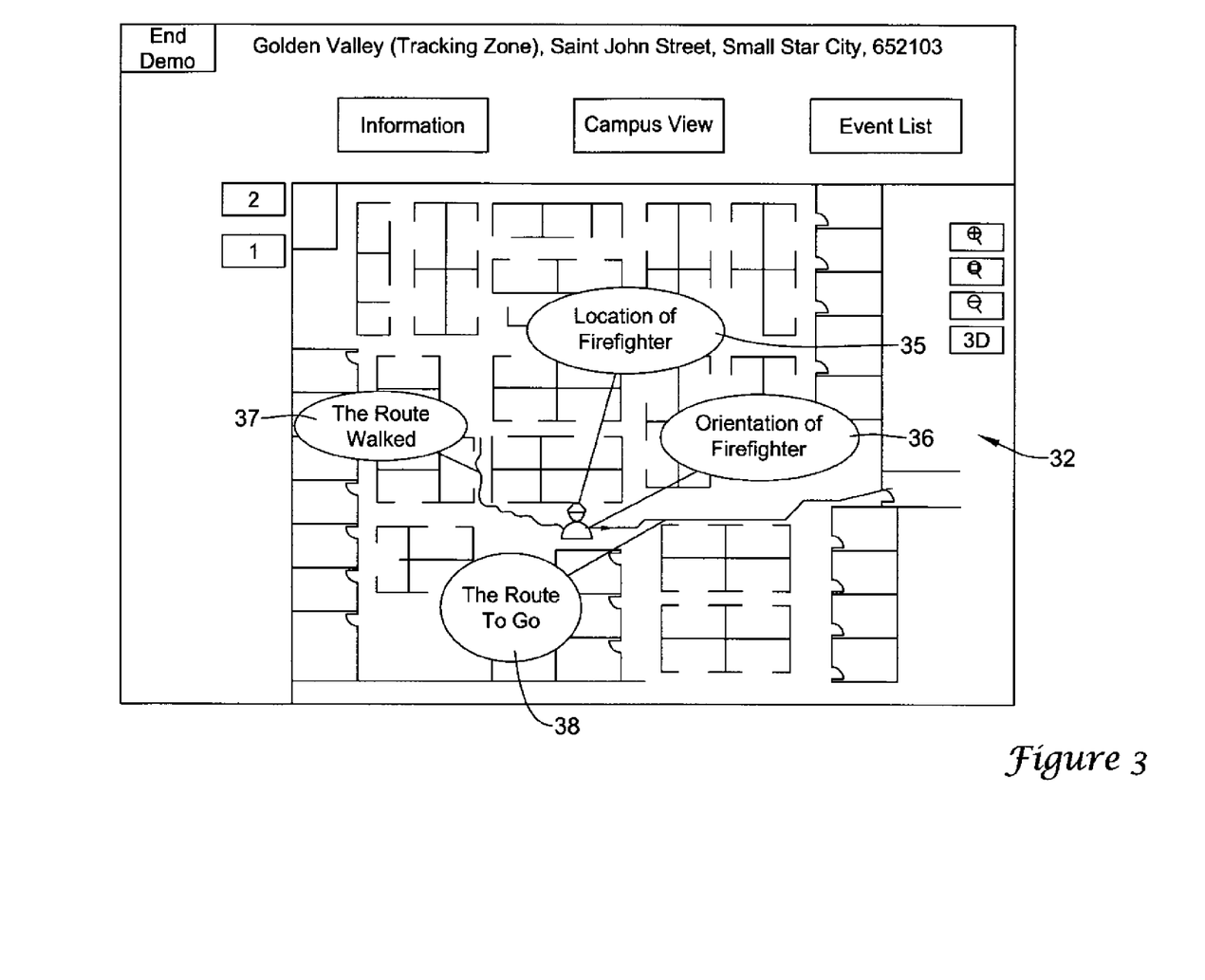
FIGS. 3 and 4 are diagrams showing graphics of two-dimensional and three-dimensional floor plans of a building of interest.
Figure 4:
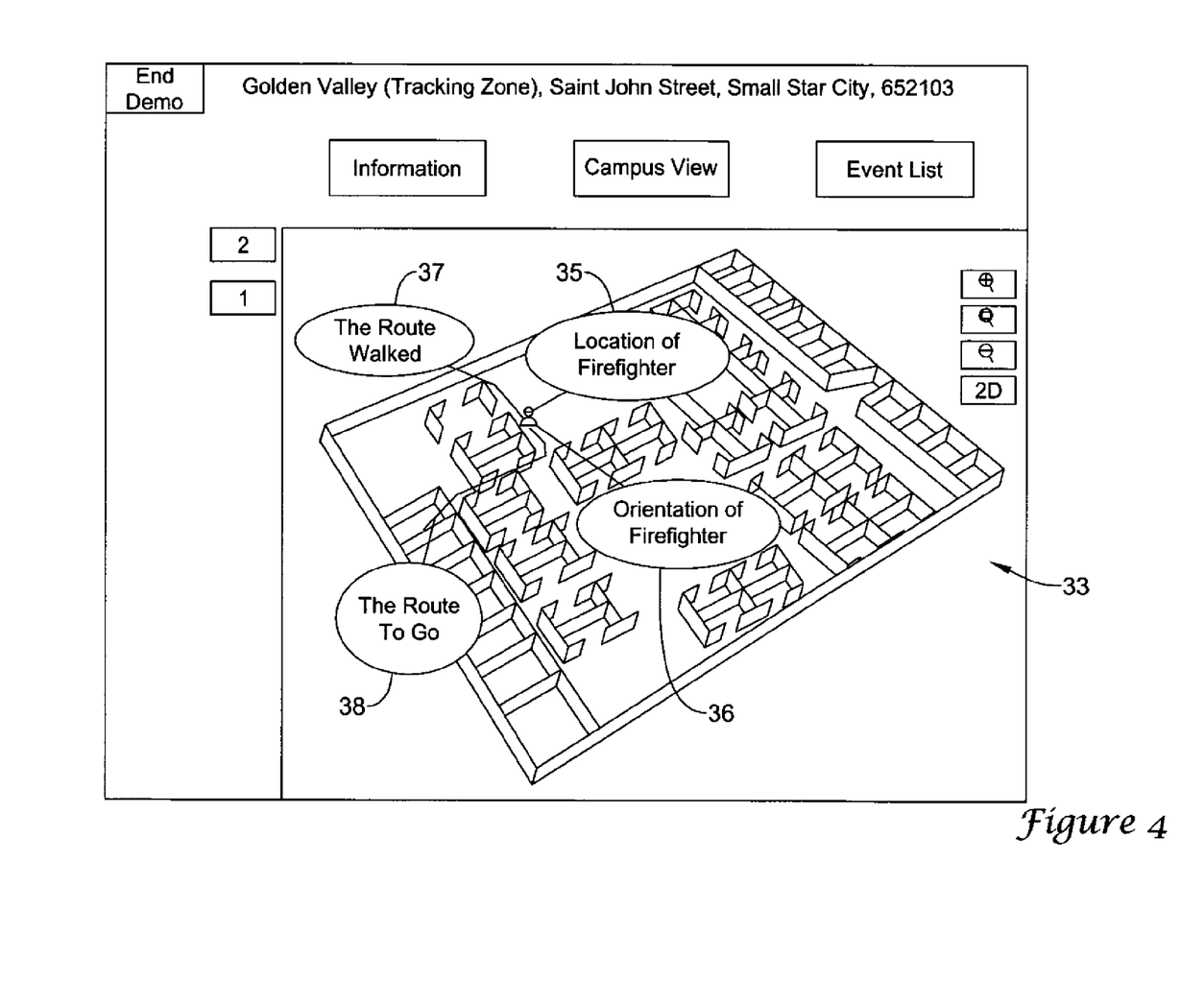

FIGS. 3 and 4 are diagrams showing the graphics of the 2D and 3D floor plans 32 and 33, respectively. The plans show the possibly related objects. A location 35 and the orientation 36 of a firefighter are shown in plans 32 and 33. Also shown are a route 37 walked along and a route 38 to be walked by the firefighter.

Figure 5:
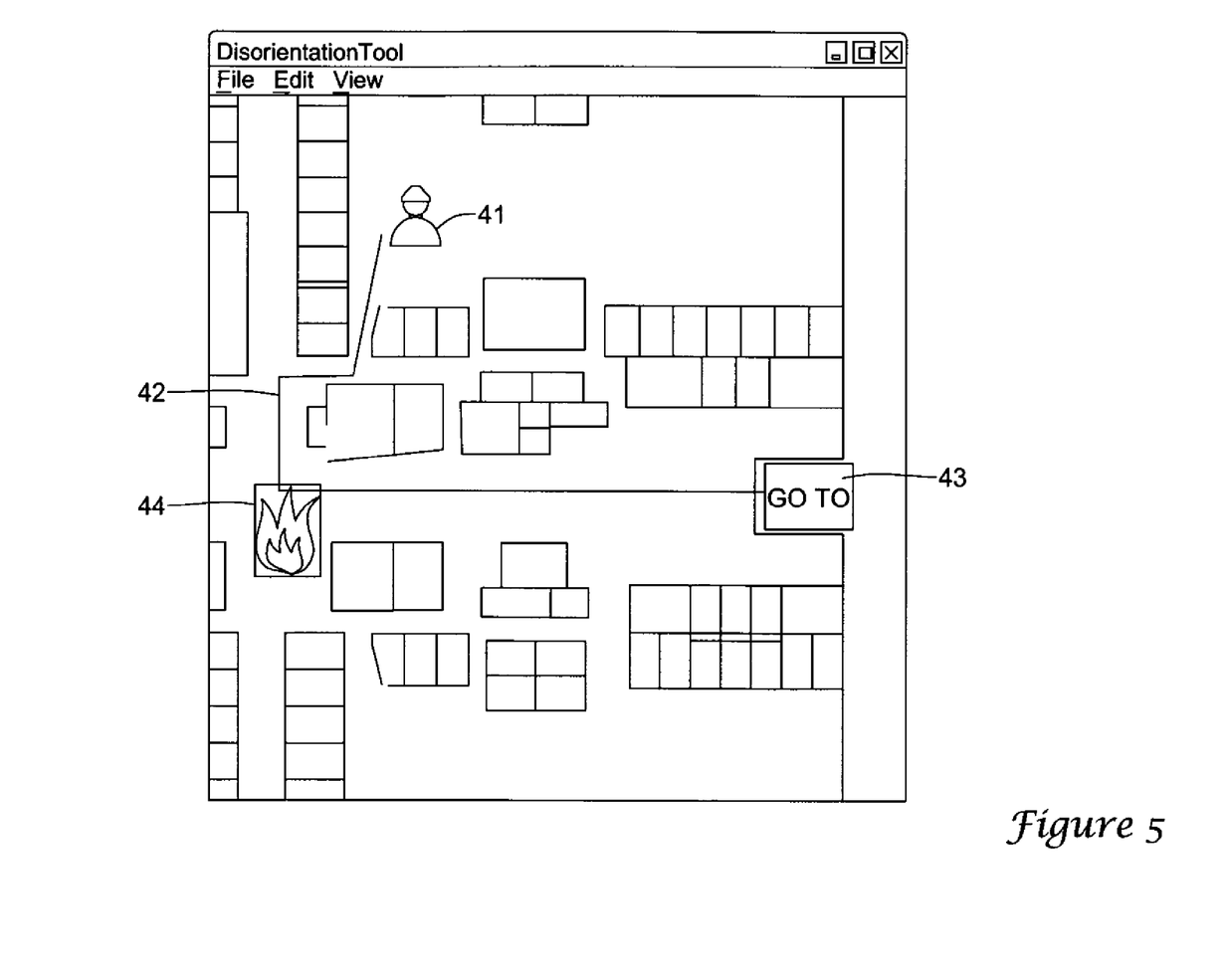
FIG. 5 is a diagram of a floor plan for providing an interface to define a rescue or evacuation route relative to a fire and/or smoke on a floor.

FIG. 5 is a diagram of a destination setting. The diagram may be used to provide an interface to define the rescue or evacuation route relative to a fire 44. Steps may incorporate: selecting a firefighter 41 or group of firefighters; drawing a route 42; setting a destination 43 or sending a command for the firefighter 41 or the group. The route may be precise. The approach may calculate the route which can save much task assignment time. For sending the command, the approach may calculate the optimal egress for evacuation. For this command, the optimal route will be calculated with directions like "Go to room X".

Figure 6:
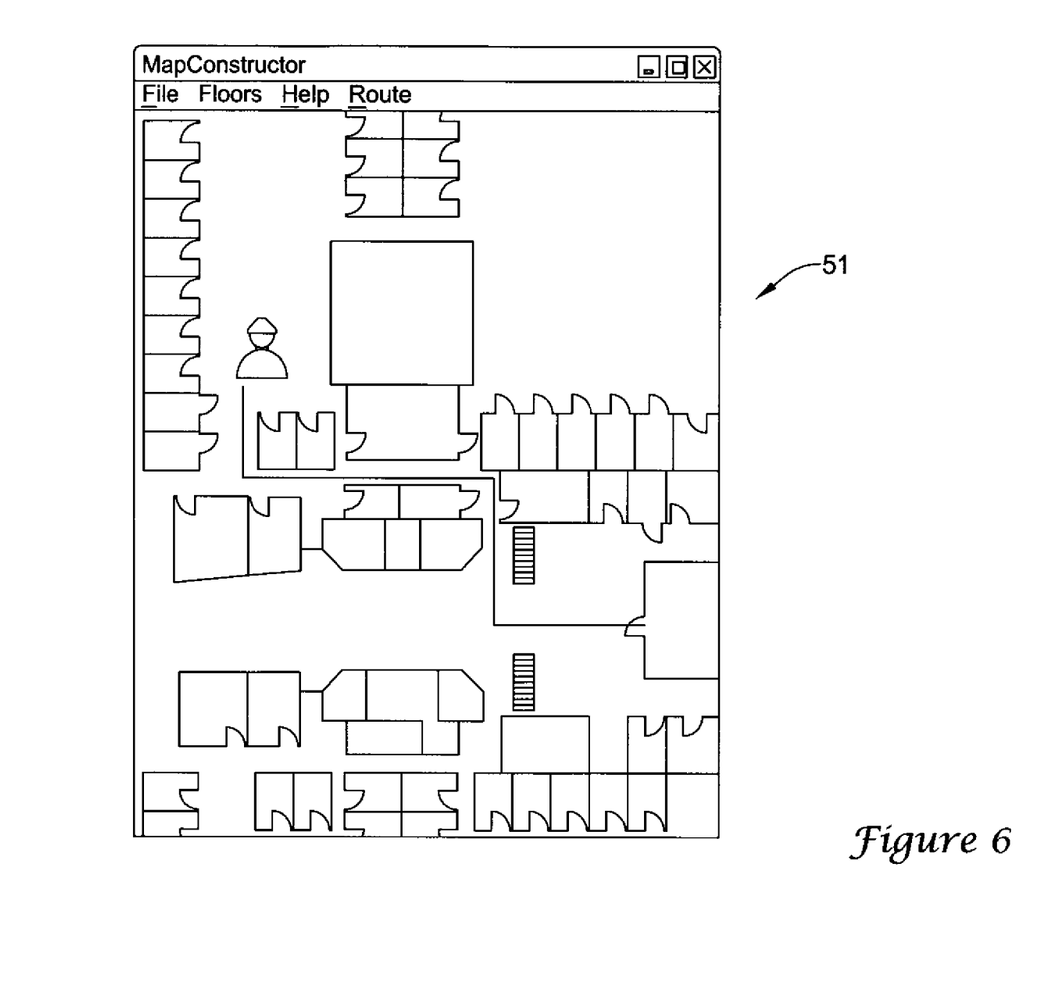
FIG. 6 is a diagram of a floor plan which may be used in route calculation.

FIG. 6 is a diagram of a floor plan 51 which may be used in route calculation. Building semantic data may be obtained. A 1×1 foot size grid-based map may be created on the floor plan. Different values may be assigned to grids of the map. One may mark the walls as red grids and the reachable grids as green grids. The grid map may be updated at runtime. A high value may be set to the grid with fire. An unreachable state may be set to the grid on a locked door, and so on. A destination for a firefighter may be set and an optimal route may be calculated with an algorithm.

Figure 7:
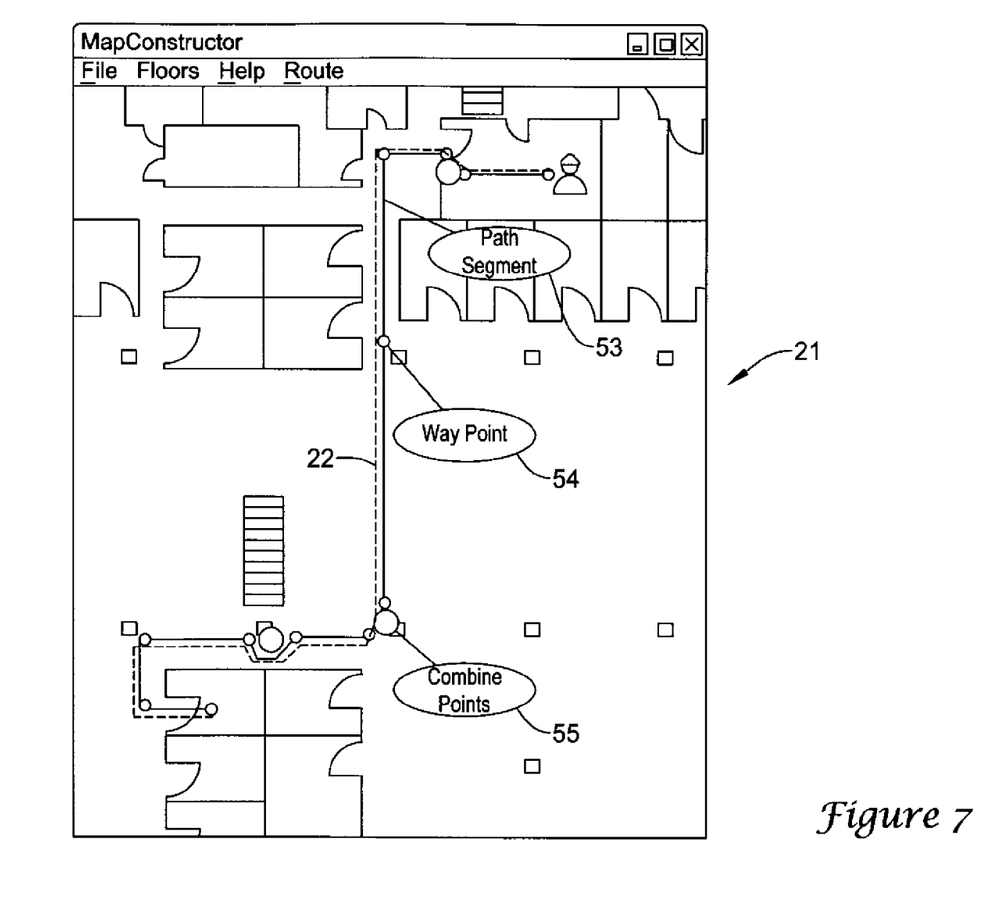
FIG. 7 is a diagram of a floor plan which may be used to split a route into path segments and waypoints.

FIG. 7 is similar to FIG. 2 and is a diagram of a plan of floor 21. The plan may be used to segment a route 22 (i.e., split the route into path segments and waypoints) with constraint rules, as illustrated with some of the following illustrative examples. A path segment 53 may be less than some value such as 30 feet. A waypoint 54 may be at a turning corner. A waypoint 54 may be added at a landmark such as a door, a column, and so on. Two waypoints with a small distance between them, such as less than two feet, may be combined into one waypoint 55. Also, two waypoints with the same landmark may be combined.

Figure 8:
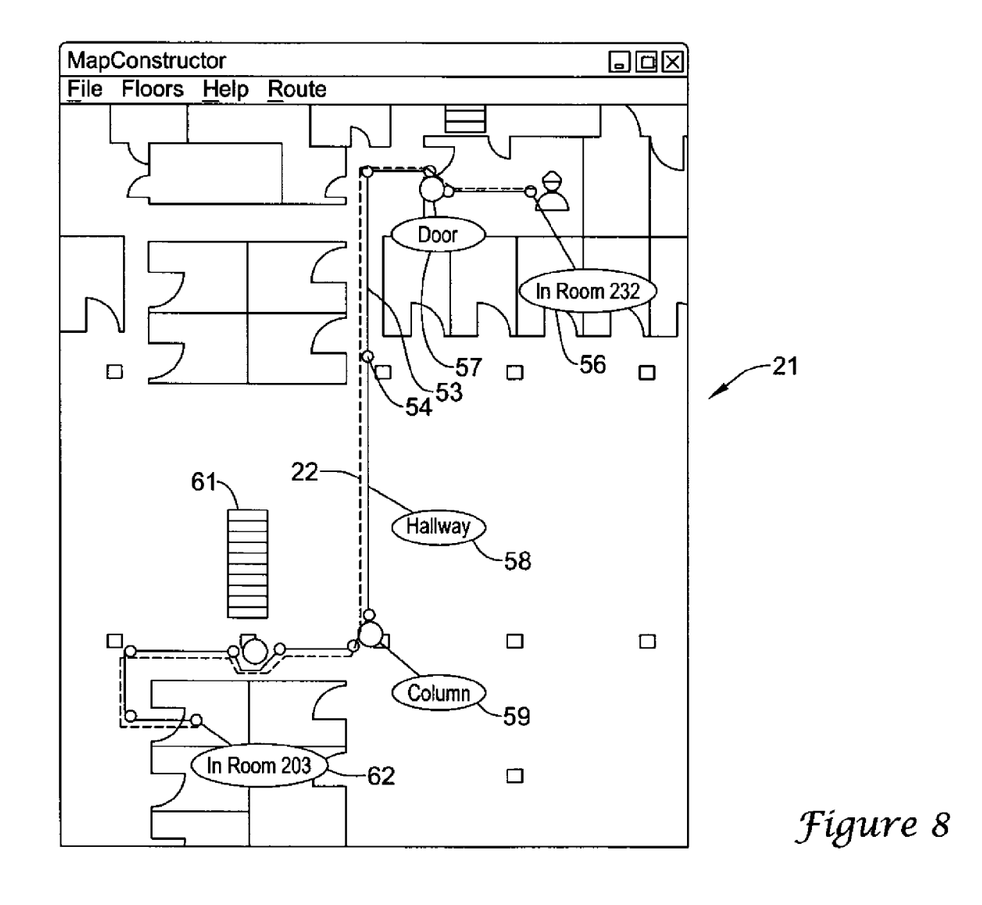
FIG. 8 is a diagram of a floor plan showing a route incorporating building semantic information.

FIG. 8 is a diagram of a plan for floor 21. A route 22 may be enriched with building semantic information attached to a waypoint 54 or segment 53. Semantic information may include expressions like "In Room 232" 56, "Door" 57, "Hallway" 58, "Column" 59, "Stair" 61 and "In Room 203" 62.

Figure 9:
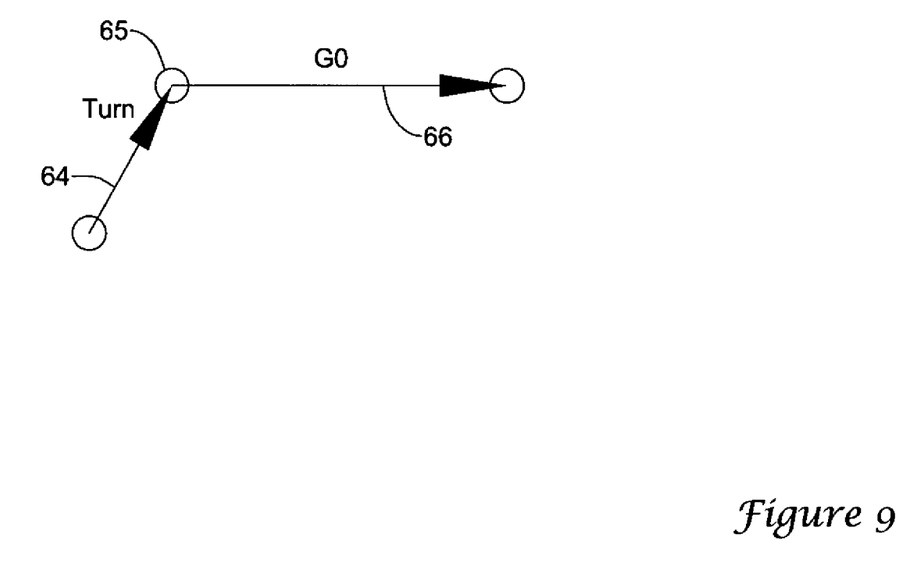
FIG. 9 is a diagram illustrating a principle for generating meaningful speech navigation commands.

FIG. 9 is a diagram indicating a principle for generating meaningful speech navigation commands. In basic route travel, one may go along a segment 64 to a waypoint 65, and then turn at waypoint 65 and go along a segment 66. In a navigation command for a route, sentence templates may be applied. Examples of templates may be "go forward until reach . . .", "go out of . . .", "go to . . .", "go along . . .", "go cross . . .", "go through . . .", "go forward some meters", "go upstairs/downstairs", "turn left/right to face to . . .", "turn around . . .", and "turn left/right some degrees . . .". There may be additional templates. The navigation command given herein for route 22 of the diagram in FIG. 2 may be an example of an application of the templates.

Simulation of a 3D beacon audio may be considered. The present approach may automatically put a beacon on the next waypoint at runtime. The 3D audio from the beacon may be simulated in a firefighter's headphone. A different tone may be used to indicate another waypoint. A different volumes and/or tempos (e.g., beeps) may be used to indicate various distances from a waypoint. In addition to tones, natural language navigation commands also may be presented as 3D audio. In this case, 3D audio may be used to present the directional command as if it emanates from the direction to which its words refer. The combination of words and directional sound provides redundant directional guidance cues. This appears especially important for directions in front of and behind the user's head, where the direction of tones is often confusing to the user. The use of words instead of tones in the 3D audio presentation may remove this ambiguity.

Feedback audio may be generated as a reminder to a firefighter. The feedback audio may be speech audio or onomatopoeia audio. The firefighter may be told when his direction is correct as the firefighter turns. The firefighter may be told if the firefighter gets to the next waypoint while walking. The firefighter may be told that if he deviates from the segment, a calculation relative to correcting the firefighter's deviation from the directed route in terms of position and orientation may be made. Other feedback may be provided to the firefighter relative to other situations.

In the present specification, some of the matter may be of a hypothetical or prophetic nature although stated in another manner or tense.

Although the present system has been described with respect to at least one illustrative example, many variations and modifications will become apparent to those skilled in the art upon reading the specification. It is therefore the intention that the appended claims be interpreted as broadly as possible in view of the prior art to include all such variations and modifications.

What is claimed is:

1. A system for guidance and navigation in a building, comprising:
   a module for obtaining locations of one or more people in the building;
   a module for selecting a route based on the locations in a building;
   a module for processing the route into waypoints and segments;
   a module for associating semantic information with waypoints;
   a module for processing the waypoints and segments into navigation commands formed from a sentence template; and
   a module for providing and associating audio tones with waypoints; and
   wherein:
   the system comprising the modules is implemented on non-transitory computer readable media; and
   the audio tones are for distinguishing waypoints from one another and pulse rates for indicating various distances of the recipient of the audio from a waypoint.

2. The system of claim 1, wherein the sentence template is a form for sentences indicating waypoints and segments of the route.

3. The system of claim 1, wherein the segments and waypoints of a route are based on constraint rules.

4. The system of claim 1, wherein:
   selecting a route within the building defined in terms of a grid of the building;
   selecting and modifying a route within the building occurs on the fly during run-time of the system; and
   structural features and conditions within the building are provided to the module for selecting a route in the building.

5. The system of claim 1 wherein:
   the module for selecting a route in a building recalls locations of a person to identify a route of ingress followed by the person; and
   the module for selecting a route computes a reverse of the route of ingress and selects the reverse as a route of egress.

6. The system of claim 1, wherein:
   semantic information is attached to waypoints and segments; and
   semantic information comprises landmarks.

7. The system of claim 1, wherein:
   the route is for egress from the building; or
   the route is for rescue of one or more people from the building.

8. The system of claim 1, wherein:
   the module for providing and associating audio tones with waypoints provides a 3D audio beacon; and
   the 3D audio beacon provides directional indications to a recipient of the beacon.

9. A method for providing guidance and navigation inside a building, comprising:
   obtaining structural information for the building with a floor plan generator and obtaining condition information about the building with hazard detectors;
   selecting a route for a person inside of the building with a route generator;
   processing the route into waypoints and segments with the route generator;
   associating semantic information with the waypoints with the route generator;
   providing navigation commands formed in natural language with a sentence template to the person for proceeding along the route via the waypoints and segments; and
   providing and associating audio tones with waypoints; and
   wherein the audio tones are for distinguishing waypoints from one another and pulse rates for indicating various distances of the recipient of the audio from a waypoint.

10. The method of claim 9, further comprising determining a location of a person for whom the route is selected.

11. The method of claim 10, wherein:
    the location is of a person seeking egress from the building; or
    the location is of a person to be rescued and of a person who is to do the rescue.

12. The method of claim 9, further comprising providing 3D audio for indicating information about the waypoints to a recipient of the 3D audio.

13. The method of claim 9, wherein:
    structural information comprises floor plans of the building; and
    condition information comprises fire and smoke locations in the building.

14. A system for guidance and navigation in a building, comprising:
    a floor plan generator;

a sensor for indicating a location of with a person in the building;
a route generator connected to the floor plan generator and location sensor for generating a route for the person; and
a sound generator for providing and associating audio tones with waypoints; and wherein:
the route is in a form of segments and waypoints demarking the segments;
the audio tones are for distinguishing waypoints from one another and pulse rates for indicating various distances of the recipient of the audio from a waypoint;
a waypoint is associated with a location;
a sequence of waypoints indicates the route;
natural language navigation commands are generated from the segments and waypoints;
natural language navigation commands are formed from sentence templates; and
semantic information is attached to one or more waypoints and/or segments.

15. The system of claim 14, wherein:
the segments and waypoints are formed according to constraint rules; and
the constraint rules comprise:
a segment is less than X length;
a waypoint is situated between two segments; and
two waypoints less than Y distance apart combine into one waypoint.

16. The system of claim 14, further comprising:
a 3D beacon audio simulator for providing information about waypoints to the person pursuing the route in the building; and wherein:
feedback audio is generated to aid the person in staying on the route;
the feedback audio is in the form of either audio tones or natural language navigation commands; and
the route is established and updated on-the-fly during runtime of the system.

17. The system of claim 1, further comprising, wherein the sentence templates comprise:
an action word;
a where word following the action word; and
an amount word following the where word.

* * * * *